United States Patent
Danner

(10) Patent No.: US 10,711,908 B2
(45) Date of Patent: Jul. 14, 2020

(54) MOTOR VEHICLE QUICK COUPLING, AND FLUID CIRCUIT

(71) Applicant: Bayerische Motoren Werke Aktiengesellschaft, Munich (DE)

(72) Inventor: Martin Danner, Haag (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/162,599

(22) Filed: Oct. 17, 2018

(65) Prior Publication Data

US 2019/0049030 A1 Feb. 14, 2019

Related U.S. Application Data

(63) Continuation of application No. PCT/EP2017/058348, filed on Apr. 7, 2017.

(30) Foreign Application Priority Data

Apr. 19, 2016 (DE) .................. 10 2016 206 622

(51) Int. Cl.
*F16K 31/14* (2006.01)
*F16K 27/02* (2006.01)
(Continued)

(52) U.S. Cl.
CPC ........ *F16K 27/029* (2013.01); *F16K 31/0655* (2013.01); *F16K 49/002* (2013.01); *F16L 37/28* (2013.01)

(58) Field of Classification Search
CPC .. F16K 27/029; F16K 31/0655; F16K 49/002; F16L 37/28
(Continued)

(56) References Cited

U.S. PATENT DOCUMENTS 4,476,892 A 10/1984 Boyce
5,339,863 A * 8/1994 Van Wie ............. F15B 13/0814
137/798
(Continued)

FOREIGN PATENT DOCUMENTS

CN 2291539 Y 9/1998
CN 201723301 U 1/2011
(Continued)

OTHER PUBLICATIONS

International Search Report (PCT/ISA/210) issued in PCT Application No. PCT/EP2017/058348 dated Jul. 11, 2017 with English translation (six (6) pages).
(Continued)

*Primary Examiner* — Minh Q Le
(74) *Attorney, Agent, or Firm* — Crowell & Moring LLP

(57) ABSTRACT

A motor vehicle quick coupling for a fluid connection in a motor vehicle includes a coupling body in which a fluid line is formed through which a fluid can flow. The quick coupling has a first fluid interface which is designed such that the quick coupling can be connected directly to a fluid-conducting component of the motor vehicle, in particular to a radiator, such that the component supports the quick coupling. The quick coupling has a second fluid interface which is fluidically connected to the first fluid interface via the fluid line. The quick coupling includes a valve which has a valve closure element that extends into the fluid line.

11 Claims, 2 Drawing Sheets

(51) Int. Cl.
*F16K 49/00* (2006.01)
*F16K 31/06* (2006.01)
*F16L 37/28* (2006.01)

(58) Field of Classification Search
USPC ..... 137/487.5, 798, 899, 269, 271; 251/143, 251/366, 904, 129.01; 285/148.2, 149.1, 285/148.21
See application file for complete search history.

(56) References Cited

U.S. PATENT DOCUMENTS

| | | | | |
|---|---|---|---|---|
| 5,341,773 | A * | 8/1994 | Schulte | F02D 9/105 123/184.61 |
| 5,577,706 | A | 11/1996 | King | |
| 5,878,715 | A * | 3/1999 | Hernandez | F02D 9/02 123/184.61 |
| 5,915,410 | A | 6/1999 | Zajac | |
| 5,988,131 | A * | 11/1999 | Hernandez | F02D 9/1035 123/184.21 |
| 6,422,258 | B1 * | 7/2002 | DuHack | F16K 27/029 137/15.09 |
| 6,941,969 | B2 * | 9/2005 | Apostolides | F01M 11/0408 137/560 |
| 7,128,038 | B2 * | 10/2006 | Kawai | F02D 9/1035 123/184.21 |
| 7,374,147 | B2 * | 5/2008 | Nohl | F16K 1/221 251/129.04 |
| 7,735,521 | B2 * | 6/2010 | Holtwick | B41F 7/30 137/271 |
| 2003/0197142 | A1 | 10/2003 | Tawns | |
| 2004/0123835 | A1 | 7/2004 | Kawai et al. | |
| 2005/0189509 | A1 | 9/2005 | Peric | |
| 2006/0273576 | A1 | 12/2006 | Bergamante | |
| 2007/0210272 | A1 * | 9/2007 | Giacomini | F16K 27/067 251/148 |
| 2007/0289650 | A1 * | 12/2007 | Krywitsky | F16K 27/07 137/798 |
| 2009/0229812 | A1 | 9/2009 | Pineo et al. | |
| 2012/0090713 | A1 * | 4/2012 | Cooley | E02F 9/2275 137/798 |
| 2013/0134333 | A1 * | 5/2013 | Schade | F16K 31/047 251/129.01 |
| 2014/0001386 | A1 * | 1/2014 | Chuang | F16K 27/029 251/129.15 |
| 2014/0083543 | A1 * | 3/2014 | Wei | F16K 11/07 137/798 |
| 2014/0246615 | A1 * | 9/2014 | Volz | F16K 27/029 251/129.15 |
| 2015/0226348 | A1 * | 8/2015 | Onodera | F16K 39/024 251/129.01 |
| 2016/0265485 | A1 * | 9/2016 | Massard | F02D 41/005 |
| 2017/0122266 | A1 * | 5/2017 | Park | F02M 25/0836 |
| 2017/0248262 | A1 * | 8/2017 | Taniguchi | F16K 27/00 |

FOREIGN PATENT DOCUMENTS

| | | |
|---|---|---|
| CN | 202157951 U | 3/2012 |
| CN | 103216476 A | 7/2013 |
| DE | 60 2004 006 859 T2 | 1/2008 |
| DE | 20 2010 009 871 U1 | 9/2011 |
| DE | 10 2010 023 368 A1 | 12/2011 |

OTHER PUBLICATIONS

German-language Written Opinion (PCT/ISA/237) issued in PCT Application No. PCT/EP2017/058348 dated Jul. 11, 2017 (five (5) pages).

German-language Search Report issued in counterpart German Application No. 102016206622.6 dated Nov. 18, 2016 with partial English translation (11 pages).

Chinese-language Office Action issued in counterpart Chinese Application No. 201780010192.6 dated Mar. 26, 2019 with English translation (18 pages).

Chinese Office Action issued in Chinese counterpart application No. 201780010192.6 dated Oct. 9, 2019, with English translation (Fifteen (15) pages).

Chinese Office Action issued in Chinese counterpart application No. 201780010192.6 dated Jun. 27, 2019, with English translation (Fourteen (14) pages).

* cited by examiner

MOTOR VEHICLE QUICK COUPLING, AND FLUID CIRCUIT

CROSS REFERENCE TO RELATED APPLICATIONS

This application is a continuation of PCT International Application No. PCT/EP2017/058348, filed Apr. 7, 2017, which claims priority under 35 U.S.C. § 119 from German Patent Application No. 10 2016 206 622.6, filed Apr. 19, 2016, the entire disclosures of which are herein expressly incorporated by reference.

BACKGROUND AND SUMMARY OF THE INVENTION

The invention relates to a motor vehicle quick coupling for a fluid connection in a motor vehicle and to a fluid circuit in a motor vehicle, in particular the cooling circuit of the engine or the cooling medium circuit of the air-conditioning system.

There are known from the prior art quick couplings which are used in a fluid circuit of a motor vehicle, for example, in a cooling system. A quick coupling for a fluid connection constitutes the transition between a component which is generally fixedly installed in the motor vehicle and which guides fluid, for example, a radiator, and another more flexible, fluid-guiding component, such as a line, for example, a hose. The quick coupling is to this end connected to the fluid-guiding component of a motor vehicle and the fluid-guiding line so that the fluid from the fluid-guiding component can flow via the fluid-guiding line to another component of the motor vehicle, or vice versa. Generally, a (quick) coupling is used at both ends of the line in order to ensure the transition to the fluid-guiding component or the structural member of the motor vehicle.

It is further known for there to be able to be provided in the fluid circuit a shut-off valve which releases or blocks the fluid flow through the fluid circuit. Generally, such a valve has two fluid interfaces via which the valve is integrated in the fluid circuit with hoses. Furthermore, structural space and a connection possibility for the valve have to be provided in the motor vehicle in order to be able to position the valve which is integrated in the fluid circuit in the desired orientation.

It has been found to be disadvantageous in this instance that the flexibility in the configuration of the structural space is reduced because the individual components, that is to say, the valve and the (quick) couplings and the corresponding structural space required has to be taken into account. In addition, the fluid circuit comprises a plurality of fluid interfaces which increases the risk of disruption or even a failure.

An object of the invention is to provide a quick coupling by which a simply constructed fluid circuit, which is additionally space-saving, is possible.

The object is achieved according to the invention by a motor vehicle quick coupling for a fluid connection in a motor vehicle, having a coupling body in which a fluid line through which a fluid can flow is present, having a first fluid interface which is constructed in such a manner that the quick coupling can be connected directly to a fluid-guiding component of the motor vehicle, in particular to a radiator, so that the component carries the quick coupling, having a second fluid interface which is connected in terms of flow via the fluid line to the first fluid interface, and having a valve which comprises a valve closure element which extends into the fluid line.

The object of the invention is additionally achieved by a fluid circuit in a motor vehicle which comprises a motor vehicle quick coupling of the type mentioned above, wherein the quick coupling is connected to a fluid-guiding component of the motor vehicle.

The basic notion of the invention is that the quick coupling for the fluid connection at the same time comprises the valve so that the control of the fluid is carried out in the quick coupling. Additional interfaces for connecting the valve in the fluid circuit are thereby unnecessary. Furthermore, the fluid circuit is constructed in a more space-saving manner since no additional structural space is required for a separately constructed valve. At the same time, the separate connection possibility for the valve, which is otherwise required, is superfluous since it is integrated via the quick coupling in the fluid circuit. In addition, via the first fluid interface of the quick coupling, it is ensured that the valve is retained in the desired orientation. This is a result of the fact that the fluid-guiding component, to which the quick coupling is connected, carries the quick coupling via the first fluid interface. The first fluid interface is constructed in such a manner that the forces which occur, in particular the weight forces, are transferred to the fluid-guiding component so that the quick coupling is retained in a secure manner.

The fluid-guiding component is an inherently rigid subassembly which is connected to the motor vehicle in a mechanically secure manner. Generally, the component has in addition to guiding the fluid another function, such as cooling the fluid. The fluid-guiding component is thus not a line or a hose.

One aspect provides a valve seat for the valve closure element to be constructed in the coupling body, in particular in the region of the second fluid interface. The coupling body consequently constitutes a component of the valve since it comprises the valve seat with which the valve closure element cooperates when the valve is in a closed position, in which the valve blocks the throughflow of the fluid through the fluid line.

According to an embodiment, the coupling body has a valve interface via which at least one valve drive unit of the valve can be connected to the coupling body. The valve drive unit of the valve comprises a drive and the valve closure element which protrudes into the fluid line and is adjusted by the drive. The valve drive unit can be connected by way of an internal and corresponding external thread or separate securing means to the coupling body via the valve interface.

Alternatively, the valve drive unit may be securely connected to the coupling body, in particular constructed integrally therewith.

Another aspect provides for the first fluid interface to have a torsion prevention device. It is thereby ensured that the valve retains its orientation with respect to the fluid-guiding component since the coupling body cannot be twisted relative to the fluid-guiding component. Generally, the torsion prevention device prevents the quick coupling from being twisted with respect to the fluid-guiding component.

Preferably, the valve is an electric, in particular electromagnetic, valve so that a cost-effective valve is provided. The valve may be constructed as a so-called electronic actuator or as a solenoid valve in which the valve drive unit comprises a coil via which a magnetic field is produced.

Another aspect provides for the valve to be constructed in such a manner that the valve closure element can assume an open position, in which fluid can flow through the fluid line, and a closed position, in which the fluid line is blocked by the valve closure element. The valve is accordingly constructed as a shut-off valve which can assume two defined positions. In the open position, the fluid flow through the fluid circuit is enabled, whereas in the closed position no fluid can flow through the quick coupling so that the fluid flow through the fluid circuit is interrupted or blocked.

In particular, the valve is configured in such a manner that the valve closure element can assume intermediate positions between the open and the closed position. These intermediate positions are positions in which the cross-section of the released fluid line is changed so that the valve controls or regulates the quantity of flow of the fluid. The valve consequently constitutes a regulation device.

According to another aspect, the valve is constructed to be fail-safe. This means that the valve in the non-active state of the valve drive unit moves into a predefined desired position. This may, for example, be achieved by the valve, in particular the valve drive unit, having mechanical securing elements, such as resilient elements, via which the valve closure element is urged into the closed or open position if no force is produced by the drive of the valve drive unit. Depending on the field of application or field of use of the quick coupling, the fail-safe position may be the open or the closed position of the valve.

Another embodiment provides for the valve to include a heating unit which at least indirectly heats the fluid which flows through the quick coupling. The heating unit may be provided in the valve drive unit so that the heating heats the drive housing of the valve drive unit and consequently indirectly the coupling body which in turn heats the fluid. Alternatively or additionally, the heating unit may be associated with the valve closure element so that it is actively heated and discharges the heat which is produced to the fluid flowing through the fluid line. Furthermore, it is possible for the heating unit to be provided in the valve closure element so that the heat produced by the heating unit is discharged directly to the fluid. Via the heating unit, a direct and/or indirect heating of the fluid is enabled.

The quick coupling is in particular a standardized coupling.

The coupling body is preferably constructed from a metal. It is thereby ensured that the forces which occur, in particular the weight force of the valve drive unit, can be transmitted via the first fluid interface to the fluid-guiding component. In addition, metals are generally good heat conductors so that the indirect heating of the fluid via the valve drive unit is possible in a simple manner.

In order to heat the fluid, it is already sufficient for the valve closure element to be constructed from a metal since the valve closure element is directly in contact with the fluid.

Alternatively, the coupling body may be constructed from a plastics material. In this instance, in particular reinforcement measures may be carried out so that the coupling body which is produced from plastics material is also suitable for absorbing the forces which occur. The reinforcement measures may be material variations with respect to the thickness or strength of the material and/or the material used.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
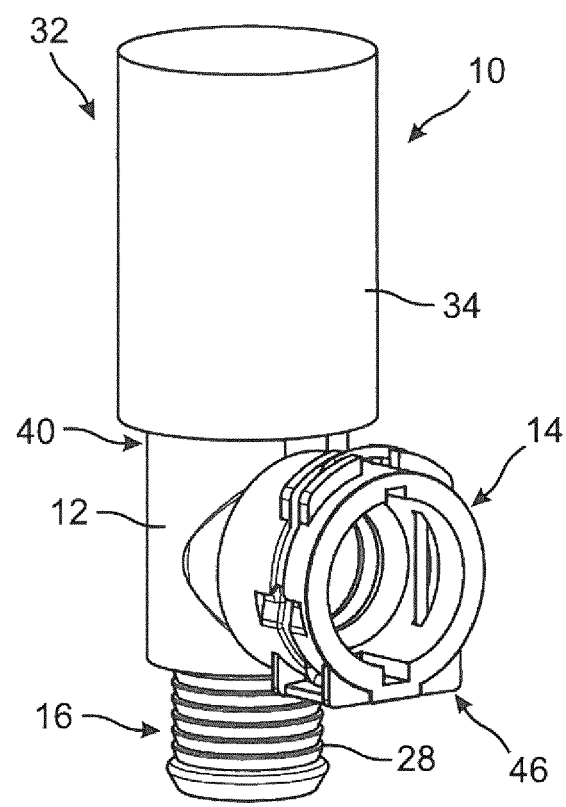
FIG. 1 is a perspective view of a motor vehicle quick coupling according to an embodiment of the invention.
Figure 2:
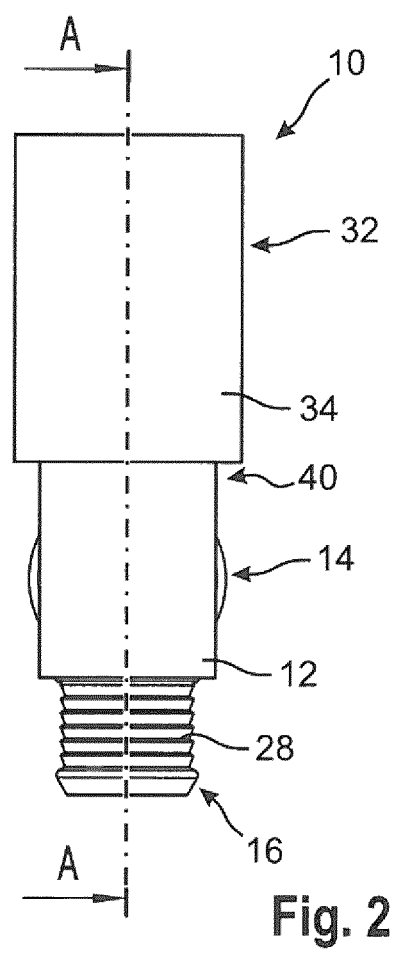
FIG. 2 is a side view of the motor vehicle quick coupling from FIG. 1.
Figure 3:
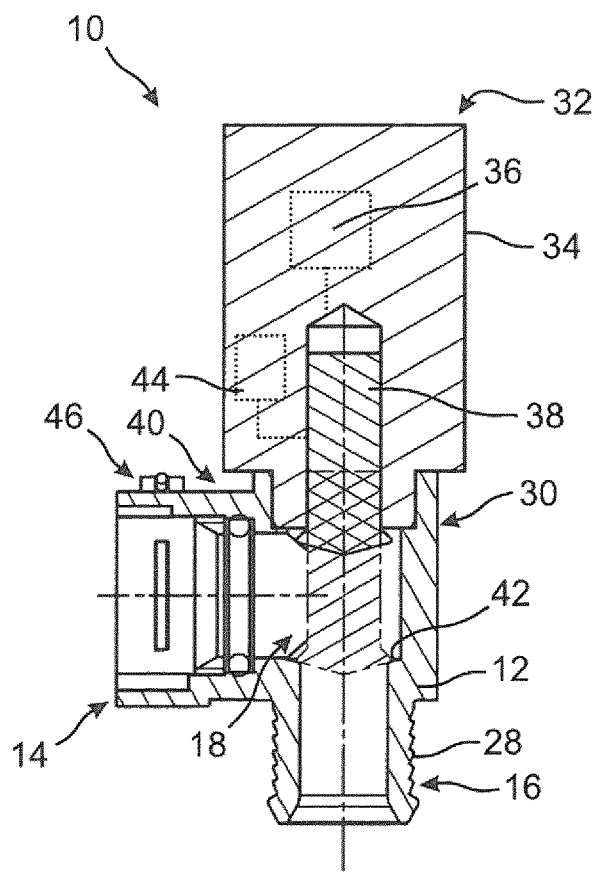
FIG. 3 is a sectioned view of the motor vehicle quick coupling taken along the line A-A from FIG. 2.

FIGS. 1 to 3 show a motor vehicle quick coupling 10 for the cooling circuit of the vehicle, which comprises a coupling body 12 on which a first fluid interface 14 and a second fluid interface 16 are provided.

In the embodiment shown, the two fluid interfaces 14, 16 are arranged at right-angles with respect to each other on the coupling body 12, wherein the two fluid interfaces 14, 16 are connected to each other in terms of flow by way of a fluid line 18 which is formed in the coupling body 12 (see FIG. 3).

In other embodiments, the fluid interfaces 14, 16 may have another angle with respect to each other.

Figure 4:
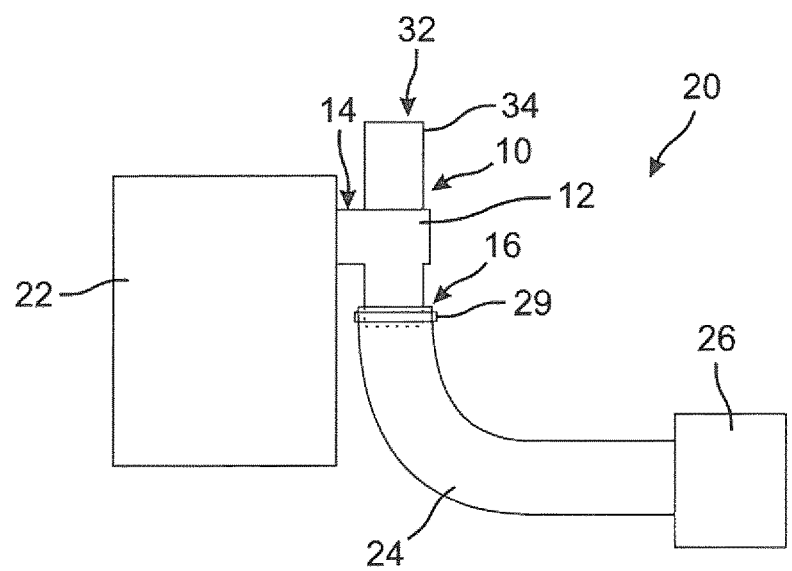
FIG. 4 is a partial view of a schematically illustrated exemplary fluid circuit according to the invention in a motor vehicle having the motor vehicle quick coupling.

As can be seen in FIG. 4, in which a portion of a fluid circuit 20 in a motor vehicle is schematically illustrated, the first fluid interface 14 is configured in such a manner that the quick coupling 10 can be connected directly to a fluid-guiding component 22 of a motor vehicle. The fluid-guiding component 22 may be a radiator of the motor vehicle.

Alternatively, the fluid-guiding component 22 may be a turbocharger or another component which guides a fluid.

The second fluid interface 16 is in contrast constructed in such a manner that a fluid-guiding component 24, such as a hose or a line, can be connected to the quick coupling 10 so that the fluid-guiding component 22 is connected in fluidically to another component 26 of the motor vehicle.

To this end, the second fluid interface 16 has at the outer side thereof ribs 28 which act as a seal and retention device when the fluid-guiding component 24 is connected to the second fluid interface 16 by being fitted over the second fluid interface 16 in the form of a connection piece. Generally, the fluid-guiding component 24 is additionally fixed to the second fluid interface 16 by means of a pressing clamp 29.

The quick coupling 10 additionally has a valve 30 (see FIG. 3) which, in the embodiment shown, is constructed as an electric valve, which is also referred to as an electronic actuator. Alternatively, the valve 30 may be constructed as a solenoid valve.

The valve 30 has a valve drive unit 32 which includes a drive housing 34, a drive 36 which is accommodated therein and a valve closure element 38 which extends into the fluid line 18 which is formed in the coupling body 12. In the embodiment shown, the drive 36 is constructed as an electric motor and the valve closure element 38 as a valve cone.

Alternatively, the valve closure element 38 may be constructed as a ball or have a different geometric shape which enables closure.

The valve drive unit 32 is secured to the coupling body 12 via a valve interface 40 of the coupling body 12. The valve interface 40 may have an inner thread and accordingly corresponding outer thread so that the valve drive unit 32 is screwed into the coupling body 12. The construction of the threads may, however, also be precisely transposed. Seals may be provided which generally ensure that the fluid flowing through the coupling body 12 is not discharged at the valve interface 40.

There is formed in the coupling body 12 in the region of the second fluid interface 16 a valve seat 42 with which the valve closure element 38 cooperates in order to control or regulate the throughflow through the valve 30 or through the quick coupling 10.

The valve interface 40 is arranged opposite the second fluid interface 16, that is to say, opposite the valve seat 42, so that the valve closure element 38 only has to be displaced in a linear manner in order to be pressed by the drive 36 of the valve drive unit 32 onto the valve seat 42. The opposing arrangement of the valve interface 40 and the second fluid interface 16 ensures that the valve 30 is constructed in a simple manner and is consequently not liable to malfunctions.

Alternatively, there may be provision for the throughflow through the valve 30 to be blocked by the valve closure element 38 in a region other than in the region of the second fluid interface 16. Accordingly, the valve seat 42 would be constructed in a different region of the coupling body 12.

The valve drive unit 32 may displace the valve 30, in particular the valve closure element 38, in such a linear manner that it assumes an open position, which is illustrated in FIG. 3, or a closed position which is illustrated in FIG. 3 with dashed lines.

In the open position, the fluid flows from the first fluid interface 14 via the fluid line 18 to the second fluid interface 16 so that the fluid flows from the fluid-guiding component 22 of the motor vehicle to the other component 26 of the motor vehicle, or vice versa (see FIG. 4).

In the closed position, the valve 30 or the valve closure element 38 blocks (together with the valve seat 42) the throughflow through the fluid line 18 so that no fluid flows from the fluid-guiding component 22 of the motor vehicle to the other component 26 of the motor vehicle, or vice versa. The valve closure element 38 and the valve seat 42 accordingly form in the closed position a fluid-tight barrier within the quick coupling 10.

Furthermore, the valve 30, in particular the valve drive unit 32, may be constructed in such a manner that the valve closure element 38 can assume intermediate positions between the open and the closed position. In these intermediate positions, the flow cross-section of the fluid line 18 is changed by the valve closure element 38, whereby the flow quantity of the fluid which flows through the fluid line 18 can be adjusted.

The further the valve closure element 38 is displaced in the direction of the valve seat 42, the smaller is the flow cross-section of the fluid line 18 and consequently of the quantity of fluid. Using the valve 30, the throughflow quantity can accordingly be controlled or regulated, for which reason the valve 30 can be used as a regulation device.

Generally, the valve 30 is constructed so as to be fail-safe, which means that it assumes a preferred, predefined position if the valve drive unit 32 fails. The preferred position may be the open or closed position, depending on the area of application or field of use of the quick coupling 10.

The failure protection can be produced by use of mechanical securing elements, such as springs, which urge the valve closure element 38 into the preferred position. The securing elements may be provided in the valve drive unit 32. For reasons of greater clarity, these securing elements are not illustrated in FIG. 3.

Furthermore, the valve 30 may include a heating unit 44 which at least indirectly heats the fluid flowing through the quick coupling 10. In the embodiment shown, the heating unit 44 is also arranged in the valve drive unit 32, in particular in the drive housing 34.

The heating unit 44 is associated with the valve closure element 38 so that it is directly heated by the heating unit 44. The fluid which is in contact with the valve closure element 38 is accordingly heated indirectly via the heating unit 44. The heating unit 44 may alternatively be provided in the valve closure element 38 or at least partially form it so that the fluid flowing through the fluid line 18 is directly heated by the heating unit 44.

Alternatively or additionally, the heating unit 44 heats the drive housing 34, whereby the coupling body 12 is also heated. The fluid flowing through the coupling body 12 is then indirectly heated by the heated coupling body 12.

The coupling body 12 comprises in particular a metal so that the coupling body 12 is thermally conductive and has a degree of rigidity.

The rigidity is generally required in order to ensure that the forces of the valve drive unit 32 acting on the coupling body 12 can be transmitted via the first fluid interface 14 to the fluid-guiding component 22 which carries the quick coupling 10 and consequently the valve 30.

Alternatively to constructing the coupling body 12 from metal, it may also be formed from a plastics material, in particular a thermally conductive plastics material. In this instance, reinforcement measures may be provided so that the forces which occur can be reliably absorbed.

The first fluid interface 14 is further preferably provided with a torsion prevention device 46, whereby it is ensured that the valve 30 has and maintains a predefined relative position or orientation relative to the fluid-guiding component 22 when the valve 30 is coupled via the first fluid interface 14 to the fluid-guiding component 22.

The torsion prevention device 46 prevents the quick coupling 10, which is connected to the fluid-guiding component 22, from twisting relative to the component 22 which would lead to an undesirable orientation of the valve 30.

The connection of the quick coupling 10 to the fluid-guiding component 22 is carried out in a simple manner such that the quick coupling 10 is fitted via the first fluid interface 14 on a connection piece of the component 22 and fastened and secured via the torsion prevention device 46.

The quick coupling 10 is further preferably constructed as a VDA (Association of the German Automotive Industry) coupling so that it can be used in accordance with standards for many vehicle components.

In an alternative embodiment, the valve drive unit 32, in particular the drive housing 34, is constructed integrally with the coupling body 12 so that the valve interface 40 is superfluous.

With the motor vehicle quick coupling 10 according to the invention, it is consequently possible in a simple manner to integrate a quick coupling and a valve 30 in the fluid circuit 20, wherein the number of fluid interfaces is minimized at the same time.

Furthermore, the motor vehicle quick coupling 10 is space-saving since no additional structural space is required for the valve 30. This also relates to the valve retention members which are otherwise required and which can be dispensed with in the motor vehicle quick coupling 10 according to the invention. The assembly complexity is additionally reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fluid circuit in a motor vehicle, comprising:
   a first fluid-guiding component, wherein the first fluid-guiding component is a rigid subassembly and is not a line or a hose and is connected to the motor vehicle in a mechanically secure manner and wherein the first fluid-guiding component is a radiator of the motor vehicle;
   a second fluid-guiding component, wherein the second fluid-guiding component is a line or a hose;
   a component of the motor vehicle, wherein the second fluid-guiding component is connected to the component of the motor vehicle;
   a quick coupling, wherein the quick coupling includes:
      a coupling body in which a fluid line through which a fluid is flowable is present;
      a first fluid interface that is connected directly to the first fluid-guiding component;
      a second fluid interface that is connected to the second fluid-guiding component, wherein the second fluid interface is connected in terms of flow via the fluid line to the first fluid interface, wherein an outer side of the second fluid interface has ribs, and wherein an end of the second fluid-guiding component is fitted over the ribs; and
      a valve which is disposed in the coupling body between the first fluid interface and the second fluid interface, wherein the valve includes a valve closure element which extends into the fluid line.

2. The fluid circuit in the motor vehicle as claimed in claim 1, wherein
   a valve seat for the valve closure element is constructed in the coupling body.

3. The fluid circuit in the motor vehicle as claimed in claim 2, wherein the valve seat is in a region of the second fluid interface.

4. The fluid circuit in the motor vehicle as claimed in claim 1, wherein
   the coupling body has a valve interface via which at least one valve drive unit of the valve is connectable to the coupling body.

5. The fluid circuit in the motor vehicle as claimed in claim 1, wherein
   the first fluid interface has a torsion prevention device.

6. The fluid circuit in the motor vehicle as claimed in claim 1, wherein
   the valve is an electric valve.

7. The fluid circuit in the motor vehicle as claimed in claim 6, wherein
   the electric valve is an electromagnetic valve.

8. The fluid circuit in the motor vehicle as claimed in claim 1,
   wherein the valve is configured such that the valve closure element can assume an open position, in which fluid can flow through the fluid line, and a closed position, in which the fluid line is blocked.

9. The fluid circuit in the motor vehicle as claimed in claim 8, wherein
   the valve is constructed such that the valve closure element can assume intermediate positions between the open and the closed position.

10. The fluid circuit in the motor vehicle as claimed in claim 1, wherein
    the valve is constructed to be fail-safe.

11. The fluid circuit in the motor vehicle as claimed in claim 1, wherein
    the valve comprises a heating unit which at least indirectly heats the fluid which flows through the quick coupling.

* * * * *